United States Patent [19]
Sutoh et al.

[11] Patent Number: 5,895,213
[45] Date of Patent: Apr. 20, 1999

[54] CLINKER COOLER

[75] Inventors: Kanzaburo Sutoh, Tsukumi; Mitsuaki Murata, Kumagaya; Akira Mochizuki, Yokohama; Koji Wakasa, Yotsukaido; Kazuto Fujiwara, Yokohama; Taro Kaetsu, Chiba, all of Japan

[73] Assignees: Chichibu Onoda Cement Corp.; Babcock Hitachi Kabushiki Kaisha

[21] Appl. No.: 08/765,841

[22] PCT Filed: May 24, 1996

[86] PCT No.: PCT/JP96/01389

§ 371 Date: Mar. 31, 1997

§ 102(e) Date: Mar. 31, 1997

[87] PCT Pub. No.: WO96/37446

PCT Pub. Date: Nov. 28, 1996

[30] Foreign Application Priority Data

May 25, 1995 [JP] Japan ................ 7-126908

[51] Int. Cl.$^6$ .................... F23H 11/10; F23H 7/08
[52] U.S. Cl. ............... 432/77; 110/270; 110/282; 110/291
[58] Field of Search ............ 432/77, 78; 110/267, 110/270, 281, 282, 289, 290, 291

[56] References Cited

U.S. PATENT DOCUMENTS

| | | | |
|---|---|---|---|
| 3,831,291 | 8/1974 | Kayatz | 432/78 |
| 4,569,437 | 2/1986 | Doerges | 110/281 |
| 4,638,905 | 1/1987 | Weiss | 110/281 |
| 5,549,471 | 8/1996 | Tegtmeier et al. | 432/77 |
| 5,572,937 | 11/1996 | Tegtmeier et al. | 432/77 |
| 5,575,642 | 11/1996 | Willis et al. | 432/78 |
| 5,617,801 | 4/1997 | Hauser et al. | 110/282 |

FOREIGN PATENT DOCUMENTS

| | | |
|---|---|---|
| 0219745 | 4/1987 | European Pat. Off. . |
| 0442129 | 8/1991 | European Pat. Off. . |
| 0553878 | 8/1993 | European Pat. Off. . |
| 0664427 | 7/1995 | European Pat. Off. . |
| 3332592 | 5/1985 | Germany . |
| 9304121 | 7/1994 | Germany . |
| 4426146 | 1/1996 | Germany . |
| 61-174150 | 8/1986 | Japan . |
| 61-030159 | 9/1986 | Japan . |
| 3021496 | 3/1991 | Japan . |

*Primary Examiner*—Teresa Walberg
*Assistant Examiner*—Gregory A. Wilson
*Attorney, Agent, or Firm*—Antonelli, Terry, Stout & Kraus, LLP

[57] ABSTRACT

A clinker cooler (3) comprises a plurality of grates (5) arranged in adjacent and overlapping relation to each other for conveying hot cement clinker (11) supplied from a kiln (1). The grate (5) is formed with an air hole (20) through which air from a fan (8) is jetted toward the cement clinker via a compartment (16) to cool the cement clinker. A distribution chamber (13) is equipped to a part of the grate corresponding to a part of cement clinker which is not cooled sufficiently, and the air from the fan (14) is jetted to such part of cement clinker which is not cooled sufficiently. The quantity of air jetted from the distribution chamber is adjusted by varying a degree of opening of a damper (15).

11 Claims, 9 Drawing Sheets

CLINKER COOLER

TECHNICAL FIELD

This invention relates to a clinker cooler for cooling cement clinker while conveying the same in a cement plant.

BACKGROUND ART

It has been known to use in a cement plant a clinker cooler by which hot cement clinker formed by burning or firing is cooled by air down to a predetermined temperature while it is conveyed through a predetermined distance.

In this kind of clinker cooler, cement clinker fallen from a rotary kiln is received on grates which are moved to convey the cement clinker to a discharge port. Cooling air in a compartment is jetted through the grates to the cement clinker so that the cement clinker is cooled while being conveyed. Cement clinker is classified due to the rotation of the rotary kiln and graded in grain size on the grates in the direction perpendicular to the grate moving direction. Namely, the thickness and grain size of the cement clinker layer on the grate are unevenly distributed in the widthwise direction. Further, the thickness of the cement clinker layer is unevenly distributed also in the cement clinker flowing direction. This makes the cooling air hard to flow locally, that is, the flow resistance to air is increased locally, resulting in a problem that the cooling of the cement clinker cannot be performed sufficiently.

To solve the above problem, according to a clinker cooler disclosed in Japanese Patent Examined Publication No. 3-21496, each of the fixed grates is equipped with an exclusive air chamber and the quantity of cooling air to be jetted is controlled by varying the pressure of cooling air in the air chamber and the temperature of the grate. However, since all the air chambers communicate with a single fan, complex operation of control valves becomes a necessity in order to maintain the pressure in every air chamber properly.

Further, the capacity of the fan must be selected in conformity with the highest flow resistance to air. This causes the power consumption to increase.

DISCLOSURE OF INVENTION

An object of the present invention is to provide a clinker cooler which has overcome the above problems.

In order to achieve this end, according to the invention, there is provided a clinker cooler comprising: a plurality of grates each having an air hole and arranged in a cement clinker conveying direction in adjacent relation to each other; a driving means for driving some of the grates to convey the cement clinker; a compartment in association with the grate, from which air is supplied to the cement clinker through the air hole to cool the same; distribution chambers each equipped in association with the respective of some of the grates, at least one grate without the distribution chamber being disposed between the two adjacent grates each equipped with the distribution chamber; and a plurality of fans each connected to at least one distribution chamber.

The present invention will be described below in conjunction with preferred embodiments by referring to attached drawings.

BEST MODE FOR CARRYING OUT THE INVENTION

Embodiment 1

Figure 1:
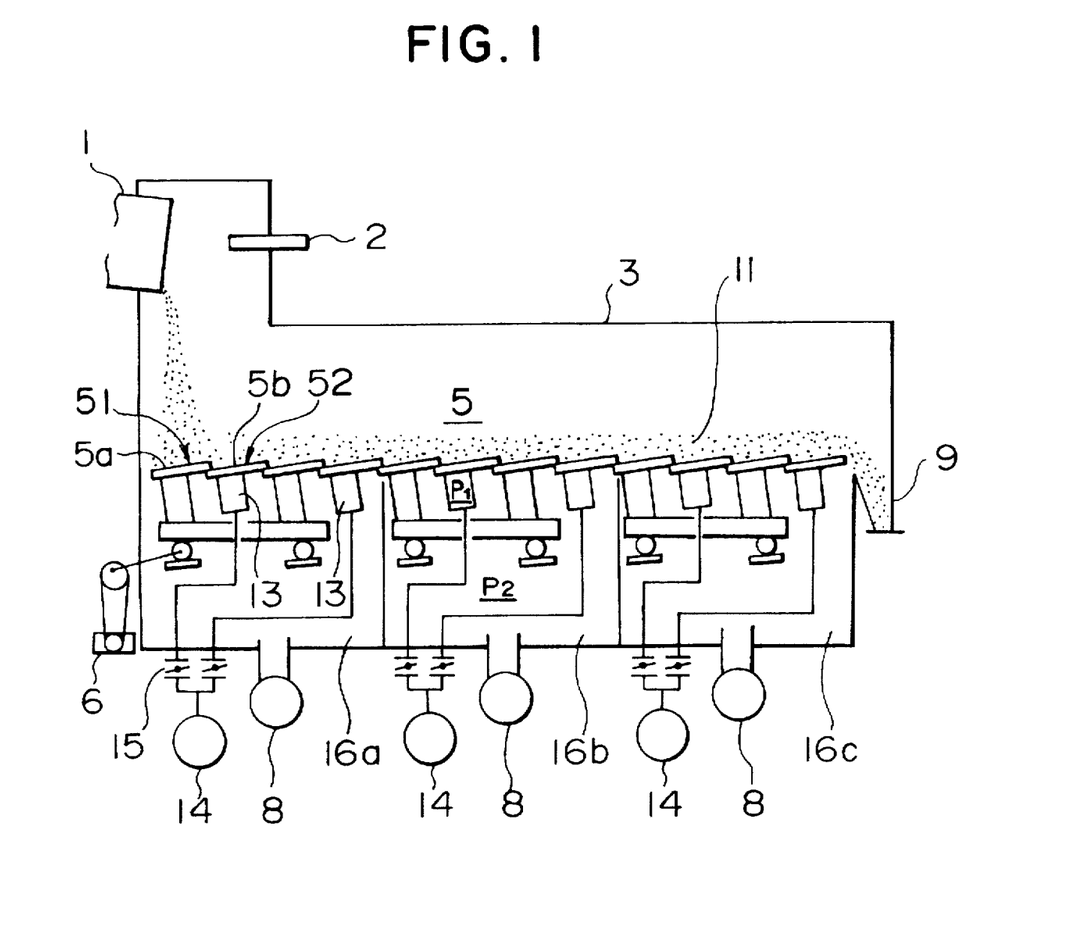
FIG. 1 is a front view of a clinker cooler according to an embodiment of the present invention.
Figure 2:
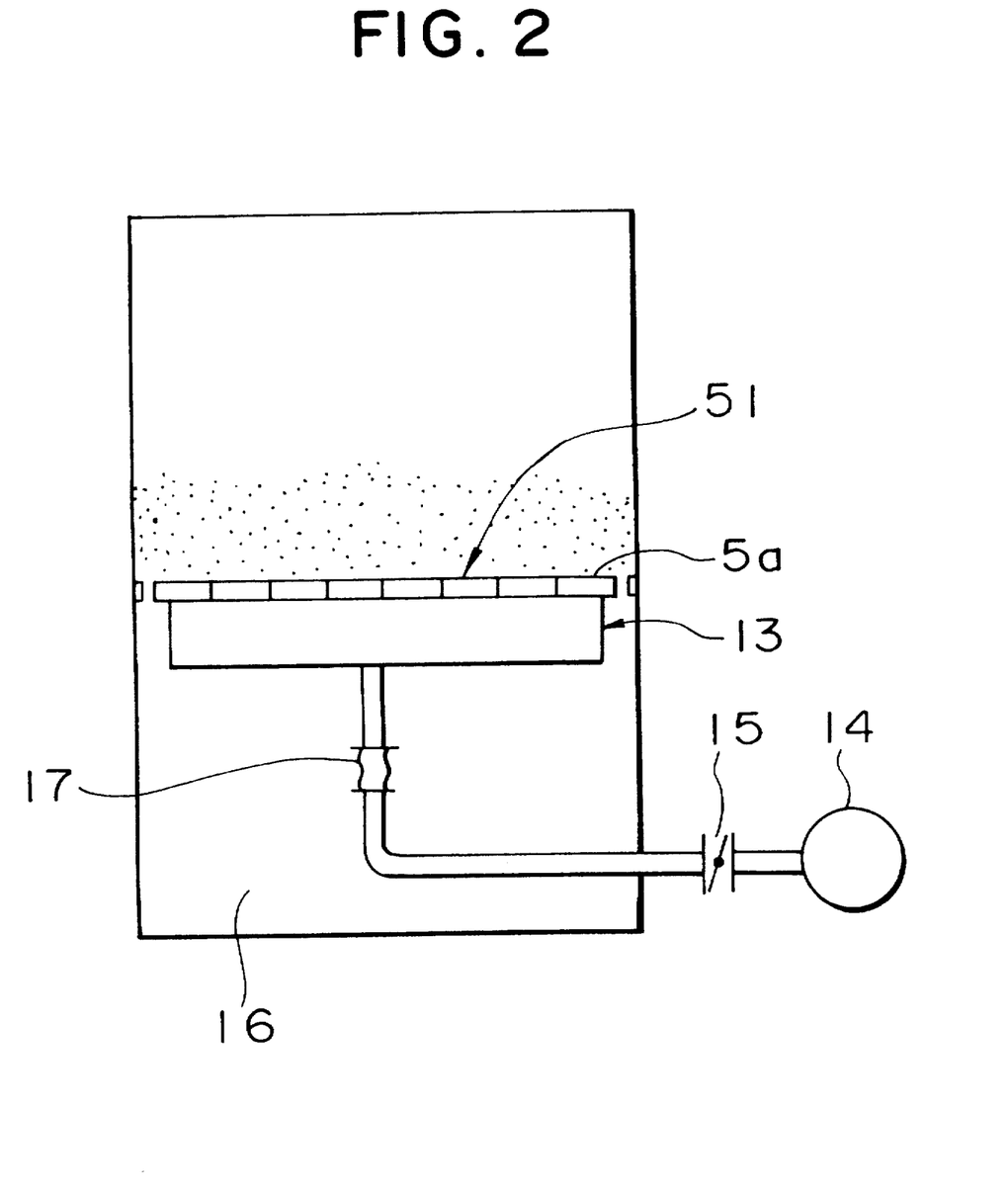
FIG. 2 is a cross sectional view of the clinker cooler of FIG. 1.

As shown in FIGS. 1 and 2, in a clinker cooler 3 according to an embodiment of the invention, hot cement clinker 11 formed by burning or firing with a burner 2 and coming out of a rotary kiln 1 is conveyed toward a discharge port 9. While being conveyed toward the discharge port 9 by means of grates 5, the cement clinker 11 from the rotary kiln 1 is cooled down by air jetted from within compartments 16 through air holes 20 formed in the grates 5 (see FIGS. 6 and 7). Three compartments 16a, 16b, 16c are formed along the direction of conveying the cement clinker 11, and a fan 8 communicates with each compartment. The grates 5 include movable grates 51 and fixed grates 52. By driving the movable grates 51 by means of a driving device 6, the cement clinker 11 is conveyed toward the discharge port 9.

As shown in FIG. 2, eight movable grate plates 5a (or fixed grate plates 5b) are arranged in the direction perpendicular to the flow of cement clinker 11 (referred to as the widthwise direction, hereinafter) to constitute one movable grate 51 (or one fixed grate 52). The movable and fixed grates 51 and 52 are arranged alternately in overlapping relation to each other along the flow of cement clinker 11.

Figure 9:
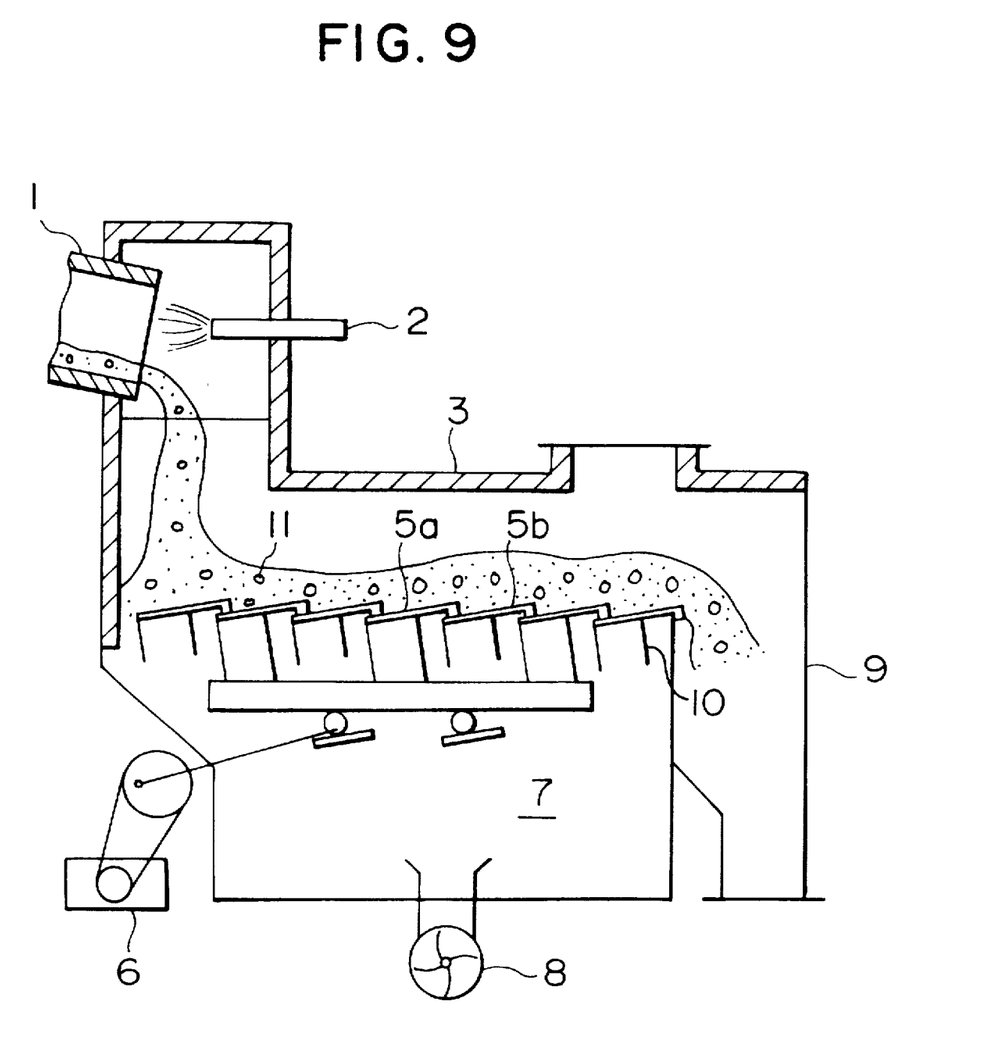
FIGS. 9 and 10 show a conventional clinker cooler.

Several fixed grates 52 are each equipped with a distribution chamber 13. The distribution chamber 13 is a sealed chamber formed by closing an opening of an open-channel support 10 of a conventional clinker cooler shown in FIG. 9. Two adjacent distribution chambers 13 communicate with a single fan 14 through respective dampers 15. By manually operating the damper 15, the quantity of air supplied to the distribution chamber 13 is adjusted. However, the distribution chamber 13 may communicate with an exclusive fan 14.

Air from the fan 14 via the distribution chambers 13 is jetted toward the cement clinker 11 through the air holes formed in the fixed grates 52 each equipped with the distribution chamber 13 and, in addition, air from the fan 8 via the compartment 16 is jetted toward the cement clinker 11 through the air holes formed in the movable grates 51 each equipped with no distribution chamber 13.

The fixed grate 52 with the distribution chamber 13 and the movable grate 51 without the distribution chamber 13 are disposed alternately along the flow of cement clinker 11.

Cement clinker 11 is gradually cooled down while being conveyed toward the discharge port 9. As the temperature of the cement clinker 11 is lowered, the air flow resistance is reduced. Therefore a quantity of cooling air jetted from the compartment 16a on the high temperature side becomes smaller than that from the compartment 16b on the low temperature side. Then, such a shortage of cooling air is calculated and the damper 15 is adjusted so that the cooling air is jetted from the distribution chamber 13 by an amount corresponding to the sum of the quantity of shortage and the quantity of cooling air jetted from the compartment 16b on the low temperature side. It is easily understood that the degree of opening of the damper 15 is made larger for the distribution chamber 13 provided on the upstream side than for the distribution chamber 13 on the downstream side with respect to the flow of cement clinker 11.

In one compartment 16, if an air pressure P1 in the distribution chamber is higher than an air pressure P2 in the compartment (P1>P2), the air from the distribution chamber (or the fixed grate) may affect the air from the compartment (or the movable grate) to disturb the flow of air from the compartment or cause the air from the distribution chamber (and the cement clinker) to flow backward into the compartment. Therefore, in this embodiment, the air pressure P1 in the distribution chamber is constantly kept lower than the air pressure P2 in the compartment (P1<P2) to prevent the air from the distribution chamber from flowing backward into the compartment. This relation must hold for every distribution chamber in the same compartment. Namely, the air pressure P2 in the compartment must be higher than the highest air pressure P1 among those in the distribution chambers in one compartment. For this purpose, the air pressures P1 in the distribution chambers and the air pressure P2 in the compartment are measured and then the degrees of opening of the respective dampers 15 are so adjusted as to satisfy P1<P2 at all times while making allowances for pressure loss.

Generally, in one compartment 16, a difference between the air pressure P1 in the distribution chamber on the downstream side with respect to the flow of cement clinker 11 and the air pressure P2 in the compartment is larger than that between the air pressure P1 in the distribution chamber on the upstream side and the air pressure P2 in the compartment, and therefore the quantity of air from the distribution chamber (or the fixed grate 52) on the downstream side may become larger than necessary. To cope with this, a total quantity of air from a pair of the movable grate 51 and fixed grate 52 should be constant by adjusting the quantity of air from the corresponding movable grate 51.

Figure 3:
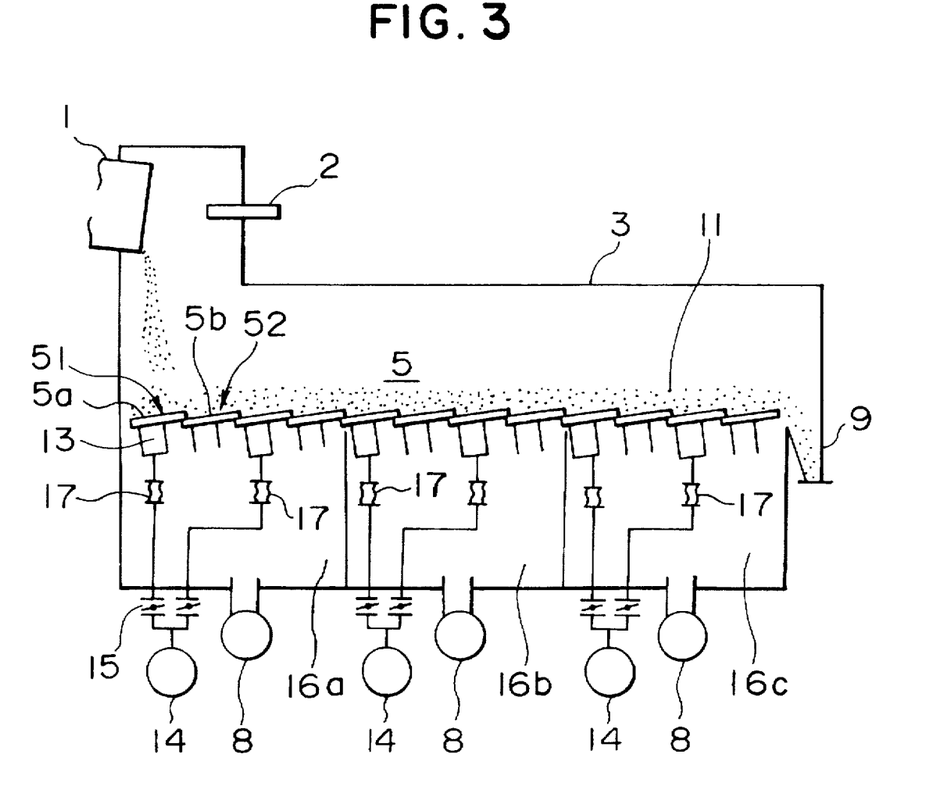
FIGS. 3 and 4 are front views of clinker coolers according to another embodiments of the present invention, respectively.

In this embodiment, all distribution chambers 13 are equipped to the fixed grates 52, however it is also possible that all distribution chambers 13 are equipped to the movable grates 51 as shown in FIG. 3. In such case, the distribution chamber 13 is connected to the fan 14 through a flexible pipe joint 17. This makes it possible to absorb a relative motion between the movable grate 51 and the pipe.

Embodiment 2

Figure 4:
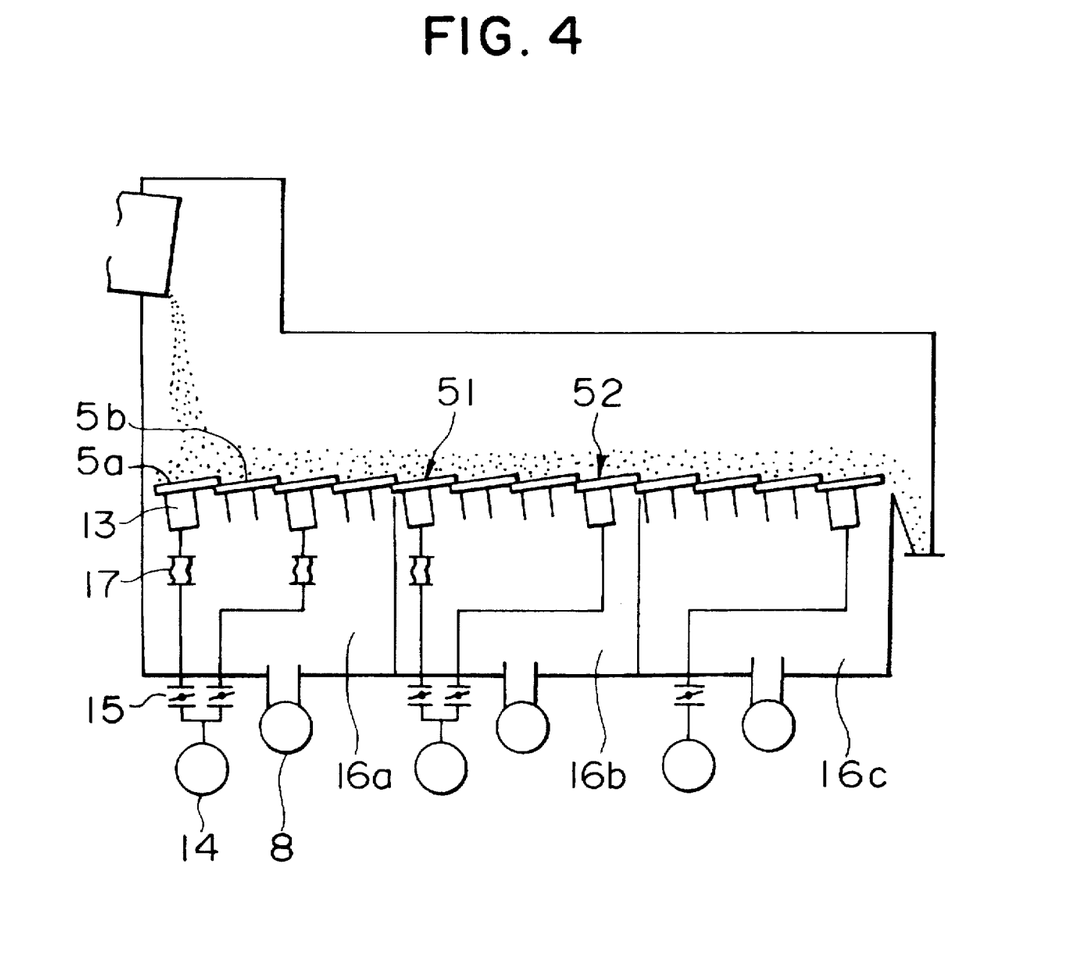

In another embodiment shown in FIG. 4, the distribution chambers 13 are equipped to both the movable and fixed grates 51 and 52. The distribution chamber 13 equipped to the movable grate 51 is connected to the fan 14 through the flexible pipe joint 17, while the distribution chamber 13 equipped to the fixed grate 52 is connected directly to the fan 14.

The number of the grates 5 which are not equipped with the distribution chambers 13 and disposed between the two adjacent grates 5 each equipped with the distribution chamber 13 gradually increases along the flow of cement clinker 11. Namely, an interval between the grates 5 each equipped with the distribution chamber 13 gradually increases toward downstream with respect to the flow of cement clinker 11.

These intervals depends on the temperature distribution of the cement clinker 11 along the flowing direction thereof.

When the distribution chamber 13 is provided in every other grate, on the downstream side, the above-described shortage in the quantity of cooling air becomes small and the quantity of air from the compartment 16 becomes nearly equal to the quantity of air from the distribution chamber 13. In this embodiment, however, the distribution chamber 13 is not equipped to every other grate but every plural grates so that a difference on the downstream side between the quantity of air from the distribution chamber 13 and that from the compartment 16c is made nearly equal to a difference on the upstream side between the quantity of air from the distribution chamber 13 and that from the compartment 16a. This makes it possible to reduce the number of the distribution chambers 13 without deteriorating the effect of the distribution chambers 13 in the high temperature section.

Embodiment 3

Figure 5:
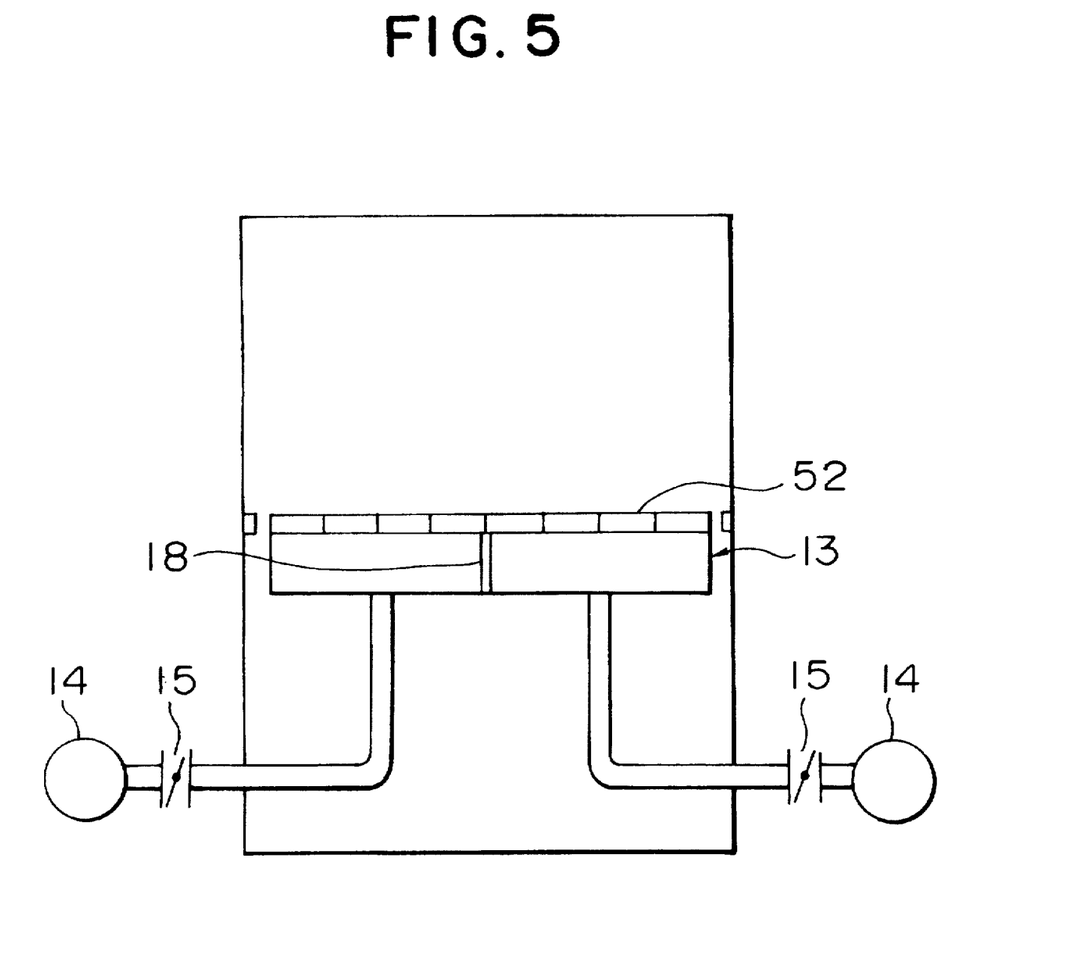
FIG. 5 is a cross sectional view of a clinker cooler.

In an embodiment shown in FIG. 5, the distribution chamber 13 is divided into two air chambers by means of a partition plate 18 in the widthwise direction. Each air chamber is connected to separate fan 14 through a damper 15.

Figure 10:
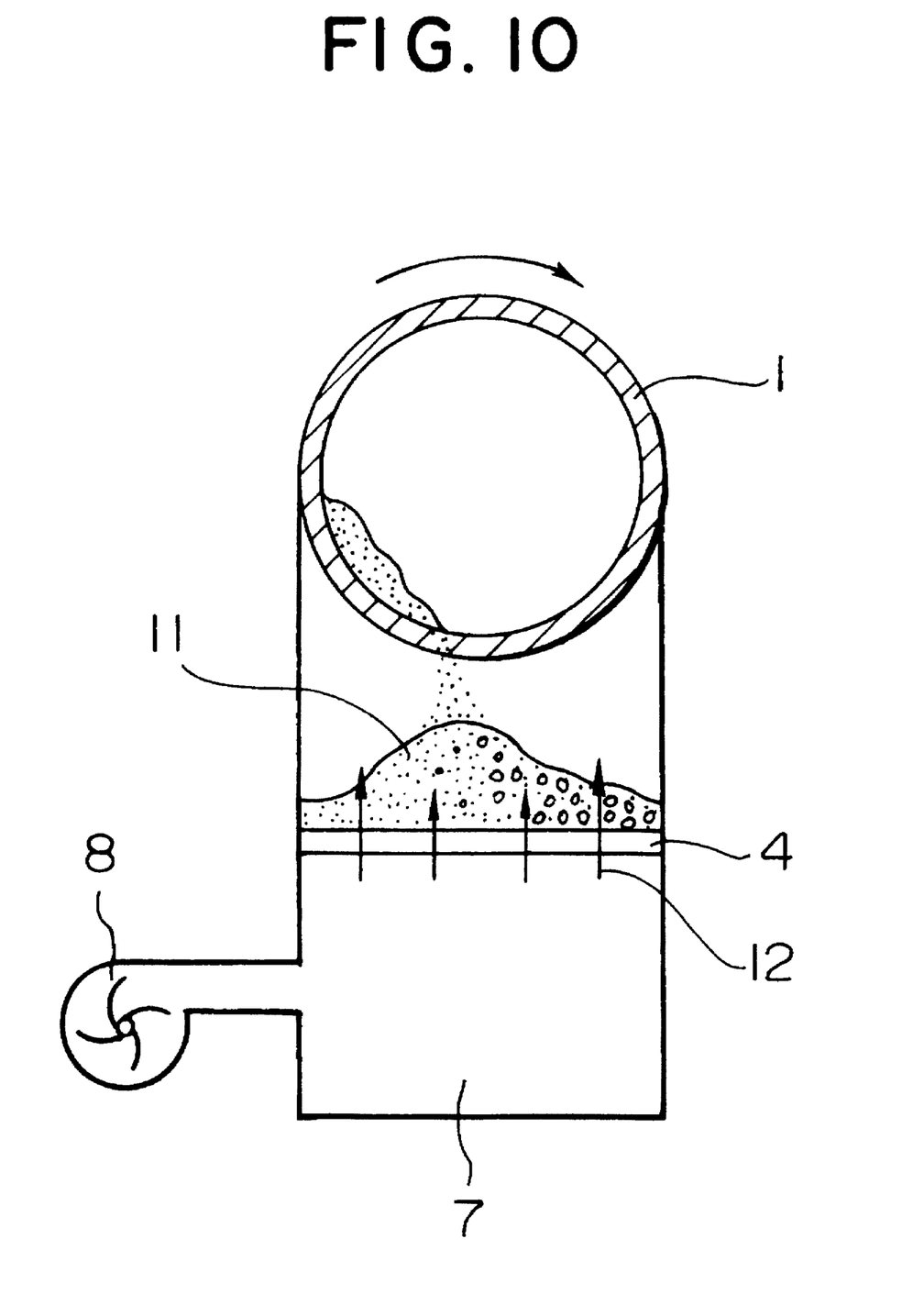

Generally, cement clinker 11 conveyed within the clinker cooler 3 is uneven in the distribution of grain size thereof on the grate 5 owing to the classifying function of the rotary kiln 1 (FIG. 10). Further, flow and scatter of the cement clinker 11 in the high temperature section (or the upstream section) promotes the unevenness in the distribution of grain size. Even if the temperature distribution on the grate 5 is uniform in the widthwise direction, in case that the distribution of grain size is uneven, the flow resistance becomes high in the portion where the average grain size of the distributed cement clinker 11 is small. Accordingly, the quantity of air from the distribution chamber 13 which is not divided into air chambers varies in the widthwise direction. In this embodiment, the quantities of air from the air chambers can be regulated separately from each other according to the widthwise distribution of the flow resistance to air. One fan may be communicated with the respective of the air chambers through two pipes in each of which the damper 15 is disposed.

Embodiment 4

Figure 8:
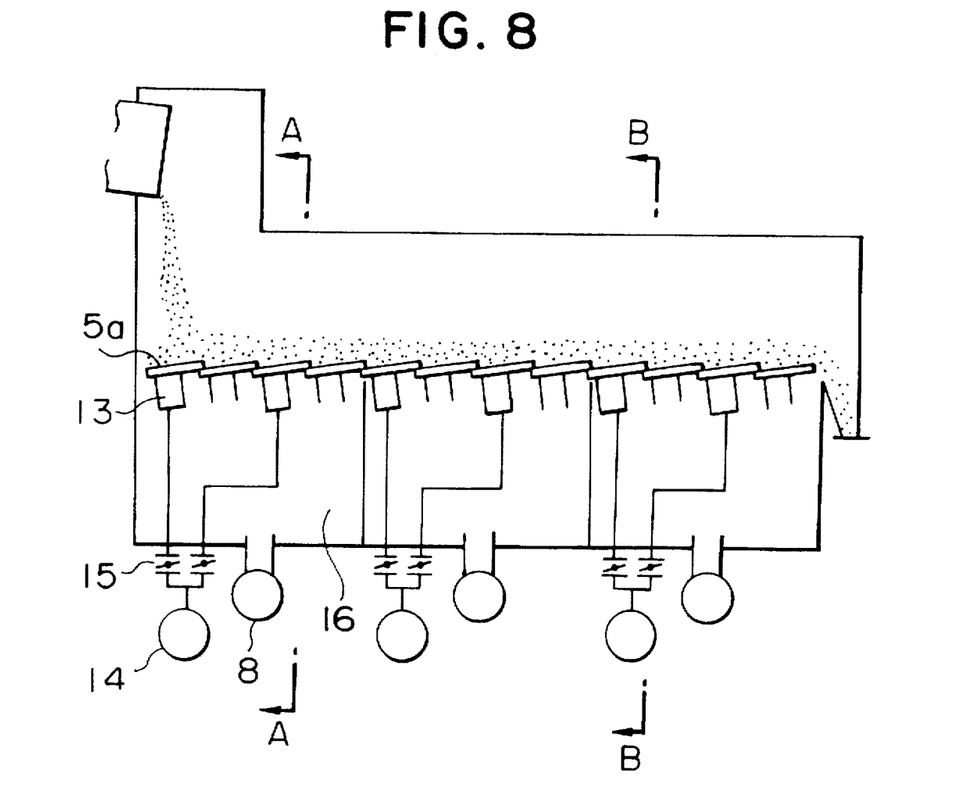
FIG. 8 is a front view of a clinker cooler according to a further embodiment of the invention.

In an embodiment shown in FIG. 8, the distribution chamber 13 on the high temperature side is equipped to extend over the whole width of the clinker cooler 3, while the distribution chamber 13 on the downstream side is equipped to cover only one or both edge portions of the clinker cooler 3. Namely, in the grate 5 on the high temperature side, air is jetted from the distribution chamber 13 through the air holes of all the grate plates 5a, 5b, while in the grate 5 on the low temperature side, air is jetted from the distribution chamber 13 through the air holes in the opposite edge portions of the grate plate and from the compartment 16 through the air holes in a central portion of the grate plate.

Figure 8A:
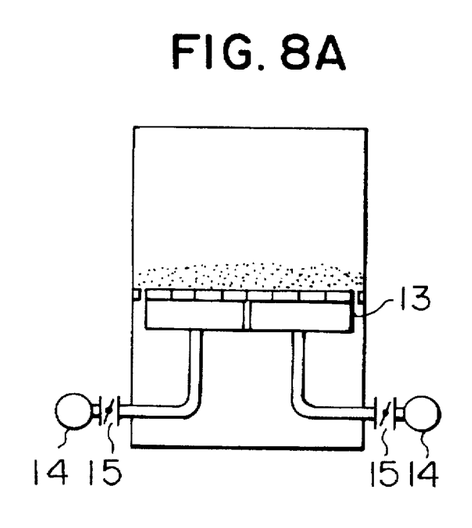
FIGS. 8A and 8B are cross sectional views taken along lines A—A and B—B of FIG. 8, respectively.
Figure 8B:
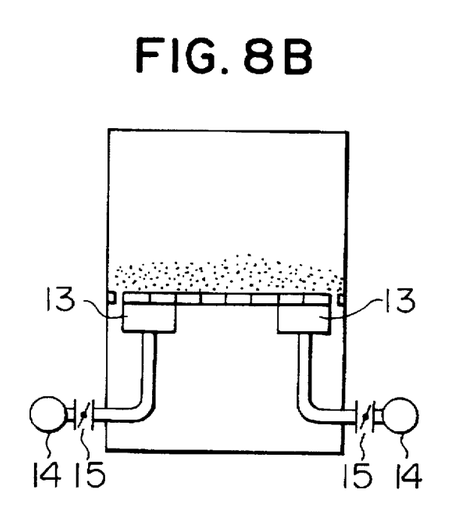

As mentioned before, the distribution of grain size of the cement clinker 11 on the grate 5 is uneven in the widthwise direction, and the cement clinker 11 of small average grain size is distributed much more at the edge portions of the clinker cooler 3. Namely, the flow resistance at the edge portions of the clinker cooler 3 is higher than that at the central portion thereof. This causes the cement clinker 11 at the central portion to be supercooled and the cement clinker 11 at the edge portions to be cooled insufficiently. As shown in FIG. 8A, it is effective, in the high temperature section (or on the upstream side), to divide the distribution chamber 13 into plural air chambers and regulate the quantities of air from the air chambers respectively. However, in the low temperature section (or on the downstream side), the distribution of flow resistance is not so uneven in the widthwise direction, and therefore the distribution chambers 13 are equipped only at the edge portions where the cooling is not sufficient so as to cool the cement clinker 11 sufficiently and, at the central portion, the cement clinker 11 is cooled by the air from the compartment 16. This makes it possible to simplify the clinker cooler.

Figure 6:
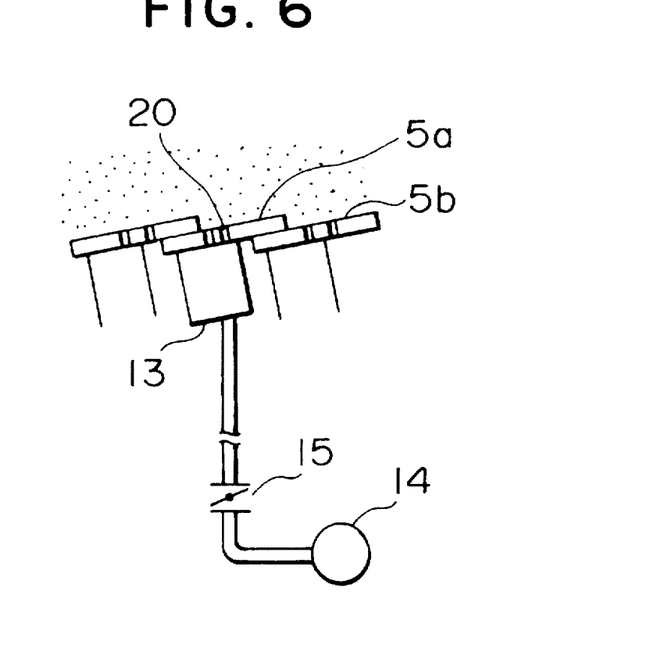
FIGS. 6 and 7 are fragmentary front views showing states of engagement between grates, respectively.

In these embodiments, as shown in FIG. 6, since the air holes 20 are formed in the portions of the movable and the fixed grate plates 5a and 5b which is never blocked by the reciprocating movable grate plate 5a, the quantity of air jetted toward the cement clinker 11 is held constant, with the result that the cooling of the cement clinker 11 is stabilized.

Figure 7:
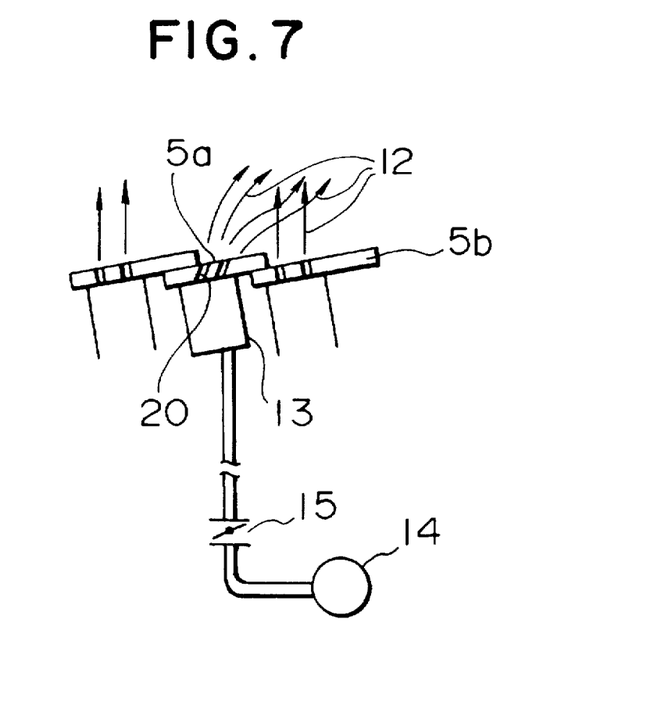

As shown in FIG. 7, if the air holes 20 are formed in the grate plate 5 in such a manner that air from the distribution chamber 13 is made to flow along the moving direction of the cement clinker 11, the quantity of air supplied from the compartment 16 and jetted through the downstream grate 5 can be made up with the air from the distribution chamber 13.

INDUSTRIAL APPLICABILITY

According to the present invention, it is possible to provide a clinker cooler which is capable of cooling cement clinker efficiently and uniformly.

We claim:

1. A clinker cooler for cooling cement clinker of high temperature supplied from a kiln, comprising:

a plurality of grates each having an air hole and arranged along a cement clinker conveying direction in adjacent relation to each other;

a driving means for driving some of said grates to convey the cement clinker;

a compartment in association with said grate, from which air is supplied towards the cement clinker through said air hole to cool the cement clinker;

distribution chambers in association with some of said grates respectively, at least one grate without said distribution chamber being disposed between the two adjacent grates each equipped with said distribution chamber; and a plurality of fans each connected to at least one distribution chamber.

2. A clinker cooler for cooling cement clinker of high temperature supplied from a kiln, comprising:

a plurality of grates each having an air hole and arranged along a cement clinker conveying direction in adjacent relation to each other;

a driving means for driving some of said grates to convey the cement clinker;

a compartment in association with said grate, from which air is supplied towards the cement clinker through said air hole to cool the cement clinker;

distribution chambers in association with some of said grates respectively, at least one grate without said distribution chamber being disposed between the two adjacent grates each equipped with said distribution chamber, and each of said distribution chambers being divided into plural air chambers in a direction perpendicular to the cement clinker conveying direction; and a plurality of fans each connected to said separate air chamber.

3. A clinker cooler according to either of claims, 1 and 2, wherein said grates include a movable grate and a fixed grate, and said distribution chamber is equipped to the fixed grate.

4. A clinker cooler according to either of claims 1 and 2, wherein said grates include a movable grate and a fixed grate, and said distribution chamber is equipped to the movable grate.

5. A clinker cooler according to either of claims 1 and 2, wherein an interval between the two adjacent grates each equipped with said distribution chamber, is made wider as going downstream with respect to the cement clinker conveying direction.

6. A clinker cooler according to either of claims 1 and 2, wherein said grates include a movable grate and a fixed grate which are arranged alternately in overlapping relation to each other, and said air hole is formed in other portion than said overlapping portion of the grate.

7. A clinker cooler according to claim 5, wherein said grates include a movable grate and a fixed grate which are arranged alternately in overlapping relation to each other, and said air hole is formed in other portion than said overlapping portion of the grate.

8. A clinker cooler according to either of claims 1 and 2, wherein at least some of said air holes in the grate equipped with said distribution chamber are oriented so as to cause air coming out of said air hole to flow from the upstream side toward the downstream side with respect to the cement clinker conveying direction.

9. A clinker cooler according to either of claims 1 and 2, wherein said distribution chamber extends over the whole length of the grate in the direction perpendicular to the cement clinker conveying direction in a section where the cement clinker of high temperature is conveyed, while said distribution chamber extends cover a part of the grate in the direction perpendicular to the cement clinker conveying direction in a section where the cement clinker of low temperature is conveyed.

10. A clinker cooler according to either of claims 1 and 2, wherein said distribution chamber extends over the whole length of the grate in the direction perpendicular to the cement clinker conveying direction in an upstream section of the flow of cement clinker, while said distribution chamber extends cover a part of the grate in the direction perpendicular to the cement clinker conveying direction in a downstream section of the flow of cement clinker.

11. A clinker cooler according to either of claims 1 and 2, wherein the pressure in said compartment is higher than the pressure in each of said distribution chambers associated with said compartment.

* * * * *

UNITED STATES PATENT AND TRADEMARK OFFICE
CERTIFICATE OF CORRECTION

PATENT NO : 5,895,213
DATED : April 20, 1999
INVENTOR(S) : Sutoh Kanzaburo et al.

It is certified that error appears in the above-identified patent and that said Letters Patent is hereby corrected as shown below:

On title page, item 73 Assignee
replace "Chichibu Onoda Cement Corp; Babcock Hitachi Kabushiki Kaisha" with --Taiheiyo Cement Corporation--.

Signed and Sealed this

Fourteenth Day of March, 2000

Attest:

Q. TODD DICKINSON

Attesting Officer

Commissioner of Patents and Trademarks